P. BERTHOLD.
SUPPORT FOR BICYCLES.
APPLICATION FILED OCT. 18, 1910.

1,008,006.

Patented Nov. 7, 1911.
2 SHEETS—SHEET 1.

P. BERTHOLD.
SUPPORT FOR BICYCLES.
APPLICATION FILED OCT. 18, 1910.

1,008,006.

Patented Nov. 7, 1911.
2 SHEETS—SHEET 2.

Witnesses

Inventor
Paul Berthold

UNITED STATES PATENT OFFICE.

PAUL BERTHOLD, OF DAHLEN, GERMANY.

SUPPORT FOR BICYCLES.

1,008,006.   Specification of Letters Patent.   Patented Nov. 7, 1911.

Application filed October 18, 1910. Serial No. 587,760.

*To all whom it may concern:*

Be it known that I, PAUL BERTHOLD, a subject of the German Emperor, and a resident of Dahlen, Germany, have invented certain new and useful Improvements in Supports for Bicycles, of which the following is a specification.

This invention relates to improvements in supports for bicycles of that kind which are turnably mounted on the rear wheel axle of the bicycle and can be fixed thereon, and its object is to provide means by which said supports can be locked in their position of use in such a way that the locking means fix either the support alone or also the rear wheel, said locking means being in a known way secured in the position of use as well as in the position of rest by means of an arresting member adapted to be disengaged with the aid of a key.

The invention is distinct in that an arm, which is arranged on the support and adapted to engage in the position of use of the latter a cramp fixed on the bicycle frame, is kept fast in the latter by a bolt arranged on the bicycle frame and adapted to be fixed in two positions, which bolt is so constructed that it locks in one position only the arm of the support in the cramp and catches in the other position at the same time between the spokes of the wheel thus preventing the same from turning. The bolt can be returned from that position, in which it locks the arm in the cramp, into the position of rest also after adjustment of the arresting member, while in the other position, in which it catches at the same time between the wheel spokes, it remains arrested and can be returned into its position of rest after disengagement of the arresting member by means of a key only.

The advantages of this new arrangement consist in that upon mounting the wheel on the support by the double engagement of the bolt either the rear wheel remains free to turn or it becomes arrested, the former being desirable for cleaning purposes or repairs, the latter for locking the wheel against theft.

The accompanying drawings show the improved arrangement.

Figure 1:
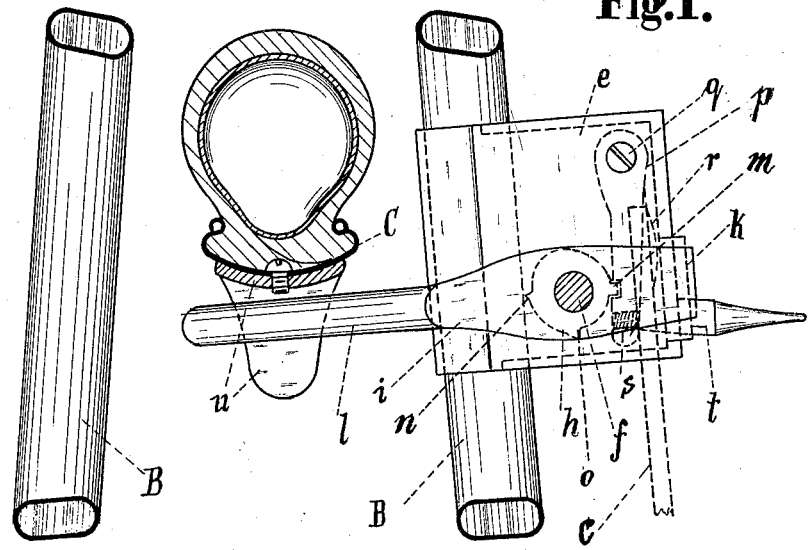
Figure 3:
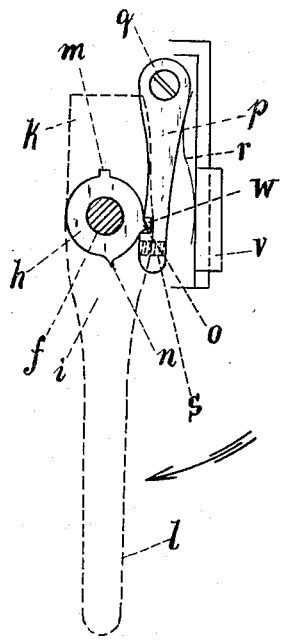
Figure 4:
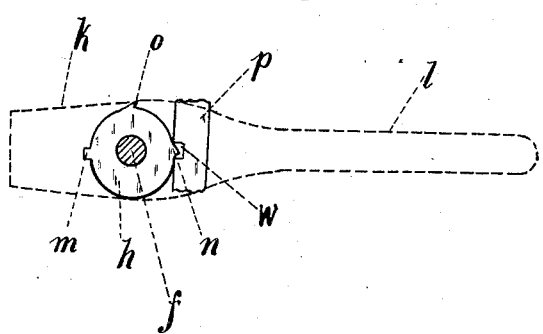
Figure 2:
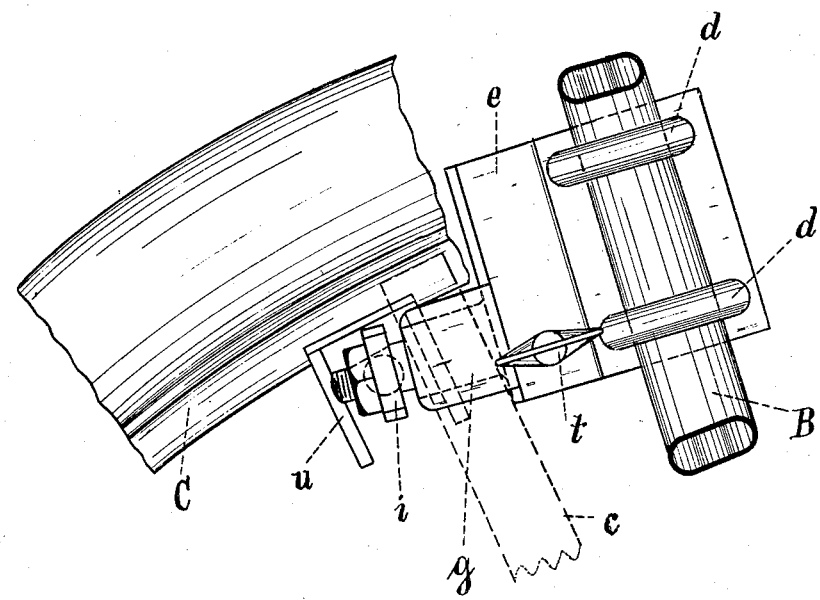
Figure 5:
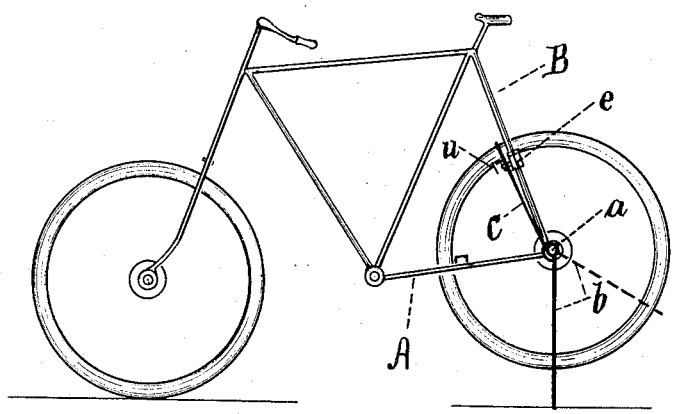
Figure 6:
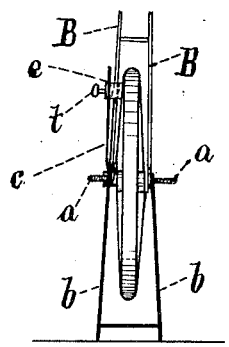

Figure 1 is a front view of the locking device, part of the bicycle frame and wheel being shown in section, Fig. 2 is a side view of Fig. 1, Figs. 3 and 4 show the separated locking bolt in different positions, while Figs. 5 and 6 are respectively a side view and rear view of a bicycle fitted with the improved device.

On the axle $a$ of the bicycle rear wheel the support $b$ is turnable in the known way, which on one side, preferably on that which lies opposite to the chain wheel, is provided with an upwardly projecting arm $c$. Upon the support $b$ being not in use, it is directed rearward as shown by dotted lines in Fig. 5, it being fixed in this position by a spring hook engaging the arm $c$.

On one of the frame members B leading from the rear wheel axle to the saddle of the bicycle, a device is arranged, which serves for locking the arm $c$ upon the support $b$ being led into its position of use (Figs. 5 and 6). By means of the braces $d$ the box $e$ of the locking device is detachably fixed on the member B about at the height of the felly of the rear wheel. The box $e$ is two-parted, so that after removal of one part the elements arranged in the box are accessible.

In the box an axle $f$ is arranged, which is guided in a shell $g$ fixed on the front wall of the box. On that part of the axle, which lies in the box, an arresting disk $h$ is fixed while on the outer end of the same a bar or bolt $i$ is keyed. Said bolt $i$ carries on one side a short extension $k$ and on the other side a long arm $l$. On the arresting disk $h$ three catches are arranged. One catch $m$ is of rectangular cross section and lies in the same direction as the extension $k$. Another catch $n$ is of triangular cross section and lies in the same direction as the long arm $l$. The third catch $o$ is again of triangular cross section but so designed that one side which faces the catch $n$ is radially shaped. In the box $e$ further an arresting member $p$ is pivoted on a pin $q$, a blade spring $r$ acting to press said member against the arresting disk $h$. At the lower end of the arresting member $p$ a screw-threaded boring $s$ is provided, into which the screw-threaded end of a key $t$ can be inserted, which can be introduced through a keyhole correspondingly arranged in the wall of the box $e$. Moreover, on the inner side of the felly C, a U-shaped downwardly projecting cramp $u$ is fixed by screws or the like. Opposite to the axle $f$ or the shell $g$ respectively, a flange $v$ is provided on the front wall of the box $e$.

The operation of the described device is as follows:—Upon the bicycle being in use, the bolt $i$ points vertically downward (Fig.

3). In order to prevent the arm *l* passing by rotation of the bolt between the rear wheel spokes, the arresting member *p* is held with its recess *w* over the catch *o* and prevents the bolt from turning in the direction of the arrow (Fig. 3). Upon the support being lowered, the upper end of the arm *c* is held between the box *e*, the shell *g* and the flange *v*. Upon the bolt *i* being then turned into the horizontal position (Fig. 4), which is possible without any impediment, the long arm *l* locks the arm *c* and the support is arrested, the catch *n* engaging now the recess *w* of the arresting member *p*. The rear wheel remains in this position of the locking device free to turn, so that it can be readily cleaned or repaired. By returning the bolt anew into its vertical position (Fig. 3), the arm *c* is again released and the support can be led back into its position of rest, whereupon the wheel is again ready for use. Upon any intended turning of the bolt from its horizontal position (Fig. 4) farther in upward direction, the bolt would soon strike upon the tire of the rear wheel and thereby be prevented from further turning.

The catch *o* prevents the bolt from turning in the direction of the arrow (Fig. 3). Said turning is, however, necessary for simultaneously arresting the support in its position of use, and locking the rear wheel. To allow the further turning of the bolt in the direction of the arrow (Fig. 3), first the arresting member *p* must be removed from the disk *h*. This is effected by introducing and turning the key *t*, which by means of its screw-threaded portion draws the arresting member toward the wall of the box against the action of the blade spring *r*. Upon the arresting member being drawn back, the bolt can be brought into the horizontal position (Fig. 1). Upon the key being then again removed, the arresting member *p* is held with its recess *w* over the catch *m* and effects thereby the locking of bolt *i*. The arm *l* of the bolt *i* now passes between the spokes of the rear wheel and engages the cramp *u* on the felly of same, while the extension *k* of the bolt locks the end of arm *c* in the box *e*, shell *g* and flange *v*. The support *b* is thus locked in its position of use and at the same time the rear wheel is secured against turning, the bicycle being thus prevented from being used. As said latter locking action can be effected by the use of a key only, the proprietor of the bicycle is secured not only against theft but also against unintended engagement of the locking device.

I claim:

A device for locking supports of bicycles, comprising in combination with the support, an arm on the same, members consisting of a box, a shell and a flange on the frame of the bicycle adapted to be engaged by said arm in the position of use of said support, a two-part bolt to hold said arm in said engaged position, means to fix said bolt in position for arresting the support alone, and means to fix said bolt in position for arresting the support and at the same time also the wheel of the bicycle, substantially as and for the purpose set forth.

In testimony whereof, I have hereunto set my hand in the presence of two subscribing witnesses.

PAUL BERTHOLD.

Witnesses:
PAUL HÜBEHMANN,
RUDOLPH FRICKE.

---

Copies of this patent may be obtained for five cents each, by addressing the "Commissioner of Patents, Washington, D. C."